(12) United States Patent
Stewart

(10) Patent No.: US 9,908,157 B2
(45) Date of Patent: Mar. 6, 2018

(54) THERMAL BARRIER COATING REMOVAL PROCESS

(71) Applicant: ROLLS-ROYCE PLC, London (GB)

(72) Inventor: David Andrew Stewart, Derby (GB)

(73) Assignee: ROLLS-ROYCE plc, London (GB)

( * ) Notice: Subject to any disclaimer, the term of this patent is extended or adjusted under 35 U.S.C. 154(b) by 38 days.

(21) Appl. No.: 14/507,274

(22) Filed: Oct. 6, 2014

(65) Prior Publication Data

US 2015/0114437 A1    Apr. 30, 2015

(30) Foreign Application Priority Data

Oct. 25, 2013  (GB) .................................. 1318873.5

(51) Int. Cl.
| | |
|---|---|
| *B08B 7/00* | (2006.01) |
| *B08B 3/10* | (2006.01) |
| *C23G 1/24* | (2006.01) |
| *F01D 5/00* | (2006.01) |

(52) U.S. Cl.
CPC ............... *B08B 3/106* (2013.01); *C23G 1/24* (2013.01); *F01D 5/005* (2013.01); *F05D 2230/80* (2013.01); *F05D 2230/90* (2013.01)

(58) Field of Classification Search
CPC .... B08B 3/04; B08B 3/08; B08B 3/10; B08B 3/106; B08B 9/00; B08B 9/02; B08B 9/023; B08B 9/027; C23G 1/24; F01D 5/005; F05D 2230/80; F05D 2230/90
See application file for complete search history.

(56) References Cited

U.S. PATENT DOCUMENTS

| | | | | |
|---|---|---|---|---|
| 4,439,241 | A | * | 3/1984 | Ault ...................... F01D 25/002 134/22.17 |
| 5,643,474 | A | * | 7/1997 | Sangeeta .................. C23G 1/19 134/2 |
| 5,779,809 | A | * | 7/1998 | Sangeeta .............. B22D 29/002 134/19 |
| 6,132,520 | A | | 10/2000 | Schilbe et al. |
| 6,146,692 | A | * | 11/2000 | Sangeeta .................. C23C 4/02 29/889.1 |
| 6,158,957 | A | | 12/2000 | Marcin et al. |

(Continued)

FOREIGN PATENT DOCUMENTS

WO       WO00/06380     *  2/2000

OTHER PUBLICATIONS

Apr. 25, 2014 Search Report issued in Great Briatin Application No. 1318873.5.

(Continued)

*Primary Examiner* — Bibi Carrillo
(74) *Attorney, Agent, or Firm* — Oliff PLC

(57) ABSTRACT

The invention relates to a thermal barrier coating removal method. A metal component (32) having a thermal barrier coating is located in a vessel (12) for containing an inert liquid reservoir. The vessel (12) has a releasably sealable closure (14) so as to allow the vessel interior to be maintained at an elevated pressure in use. The vessel is heated and the liquid therein is maintained at a temperature greater than 100° C. for an extended period of time such that thermal barrier coating breaks up as a result of internal stress caused by a crystal structure change in the thermal barrier coating.

18 Claims, 1 Drawing Sheet

(56) References Cited

U.S. PATENT DOCUMENTS

| | | | |
|---|---|---|---|
| 6,354,310 B1* | 3/2002 | Farr | B08B 7/0021 134/105 |
| 6,544,346 B1 | 4/2003 | Grossklaus, Jr. et al. | |
| 2012/0328445 A1* | 12/2012 | Ridgeway | F01D 5/286 416/224 |
| 2015/0114437 A1* | 4/2015 | Stewart | C23G 1/24 134/42 |

OTHER PUBLICATIONS

Lawson et al., "Environmental Degradation of Zirconia Ceramics," Journal of the European Ceramic Society, 1995, vol. 15, pp. 485-502.

Chevalier et al., "The Tetragonal-Monoclinic Transformation in Zirconia: Lessons Learned and Future Trends," Journal of the American Ceramic Society, Sep. 2009, vol. 92, No. 9, pp. 1901-1920.

Feb. 20, 2015 Search Report issued in European Application No. 14187714.

\* cited by examiner

THERMAL BARRIER COATING REMOVAL PROCESS

BACKGROUND OF THE INVENTION

This invention concerns the removal of thermal barrier coatings from components that are typically required to operate in a high temperature environment in use.

There exist a number of applications in which metallic components are required to operate at elevated temperatures in use, such as, for example, within combustion engines. Exposure of components to prolonged and/or intermittent heating loads can degrade the components and reduce their operational life as well as increasing the risk of unexpected component failure. For some applications, such as within the high pressure turbine of a gas turbine engine, aerofoil components are required to operate at temperatures above their melting point.

Thermal Barrier Coatings (TBC) typically comprise a ceramic material with low thermal conductivity and are used to insulate the underlying metallic structural components from the high temperature operational environment and thereby reduce degradation by oxidation and thermal fatigue.

In some other applications, rather than reducing the maximum temperature to which a component is exposed, TBCs are used to prevent heat loss and/or material loss (e.g. by oxidation) from metal components in use. Such uses are typically aimed at improving thermal efficiency in elevated temperature environments that may be within or beyond the operating range of the metal components.

Conventional ceramic TBCs may be applied by a number of different techniques, such as physical vapour deposition or spray coating techniques, to a metal substrate. Either complete or partial coatings may be applied dependent on the intended application of the substrate. The aim of the coating process is typically to achieve a very strong bond between the metal substrate and the ceramic coating layer (e.g. using a bond coat on the substrate). This strong bond is essential in order for the coating to be able to withstand repeated thermal loading cycles over its operational life as well as any other physical loading, including stress/strain and possible impact forces, placed on the component due to its intended function.

However there is also a need to remove the existing TBC from a component as part of a component salvage and/or repair process. Ideally, the coating is removed in its entirety without affecting the underlying component such that a new TBC can be reliably applied to the component. A conventional TBC removal method involves water jet stripping. This is a 'line-of-sight' process and requires careful control of the relative movement between a high power water jet and the component in order to completely remove the coating. There exists the possibility that small remnants of the TBC may not be removed, which can cause issues for salvage or repair of the component. For some component geometries, there exists a problem in removing a complete coating using a line-of-sight removal process. That is to say, some regions of a component can be hidden and inaccessible to a water jet. One example of such a problem occurs with components comprising multiple aerofoils/vanes, such as nozzle guide vanes for a gas turbine engine, in which a trailing portion of an upstream vane shadows a leading portion of a downstream vane.

Furthermore a water jet stripping process can only accommodate a single component at a time.

There has now been devised a novel process which overcomes or substantially mitigates some or all of the above-mentioned and/or other disadvantages associated with the prior art.

BRIEF SUMMARY OF THE INVENTION

According to the present invention there is provided a method of removing a thermal barrier coating from a metal component, the method comprising immersing at least one component in an inert liquid reservoir and maintaining the liquid in the reservoir at a temperature above 100° C. and at an elevated pressure so as to cause degradation of the TBC.

The elevated pressure may be maintained so as to prevent boiling of the reservoir liquid. The over pressure may be slightly higher than that at which the liquid would boil at the temperature in the reservoir.

The liquid in the reservoir may be maintained at a temperature of greater than 120° C. and preferably greater than 150° C. or 200° C., such as for example between 200° C. and 400° C.

The liquid may be maintained at a temperature above its boiling point (i.e. its boiling point at atmospheric pressure). The liquid is typically maintained in the liquid phase.

The TBC typically comprises a ceramic material. The TBC may have a crystal structure. The TBC typically comprises or substantially consists of zirconia. The TBC may comprise a relatively small amount of one or more further material, such as a dopant.

The elevated temperature within the liquid may cause internal stress within the TBC material. Failure of the TBC may be caused by fracture resulting from internal stress. A volumetric change may be caused within the TBC material.

The invention has been found to be beneficial in that it replaces impact through water jetting as the mode of TBC removal. Instead, it has been discovered that maintaining the TBC at an elevated temperature within a pressurised liquid for an elongated period of time causes a phase change (i.e. a change in crystal structure within the solid TBC) in zirconia. This phase change causes a corresponding volume change, thereby causing large internal stress within the TBC layer, which causes breakup of the TBC.

The liquid may comprise water, such as purified water. The liquid may be de-oxygenated. The liquid may be deionised and/or demineralised. Distilled water may be used. A mildly basic or pH neutral liquid may be used.

The method may comprise purifying or processing the liquid prior to immersion of the component therein, for example prior to delivery to the vessel. The method may comprise de-aeration, e.g. de-oxygenation, of the liquid. The method may comprise delivery of a gas through the liquid.

The component may be maintained in the reservoir at the elevated temperature for a period of time, typically greater than a plurality of hours. The component may be maintained in the reservoir for one or more days. In one example, the component may be maintained in the liquid for one or more weeks.

A plurality of components may be maintained in the reservoir vessel concurrently. The components may be of the same or differing component types. The method may be carried out as a batch process (e.g. in which the method steps are carried out concurrently on all components in the reservoir). Alternatively, components may be entered into, and removed from, the reservoir in a time staggered manner (e.g. individually).

The invention is beneficial in that a conventional line-of-sight process can be replaced with a process that acts over the entire surface area of a TBC. The process may act substantially uniformly over the surface area of the TBC on a macroscopic scale The component may comprise a fluid-washed component in use. The component may comprise an aerofoil, such as a blade or vane. The component may comprise an aerospace component. The component may comprise an aircraft or engine component. The component may comprise a component of an axial flow machine, e.g. a gas turbine engine.

BRIEF DESCRIPTION OF THE DRAWINGS

Practicable examples of the invention will now be described in further detail, for illustration only, with reference to the accompanying drawings, in which.

DETAILED DESCRIPTION OF THE INVENTION

The invention derives from the realisation that conventional TBCs, typically comprising zirconia, can be caused to degrade by placing them in a liquid reservoir which is maintained at an elevated pressure and temperature over an extended period of time. TBCs are conventionally used in the vicinity of hot gas combustion products and so there is no requirement for thermal barrier coated components to withstand such reservoir conditions and, indeed, no need to test such coatings in those conditions. The invention was realised as a result of unexpected findings by the inventor during investigation of materials for Pressurized Water Reactors (PWR). It was subsequently realised that such findings could usefully be applied to TBC coating removal for engine components by suitable tailoring of the processing conditions.

Figure 1:
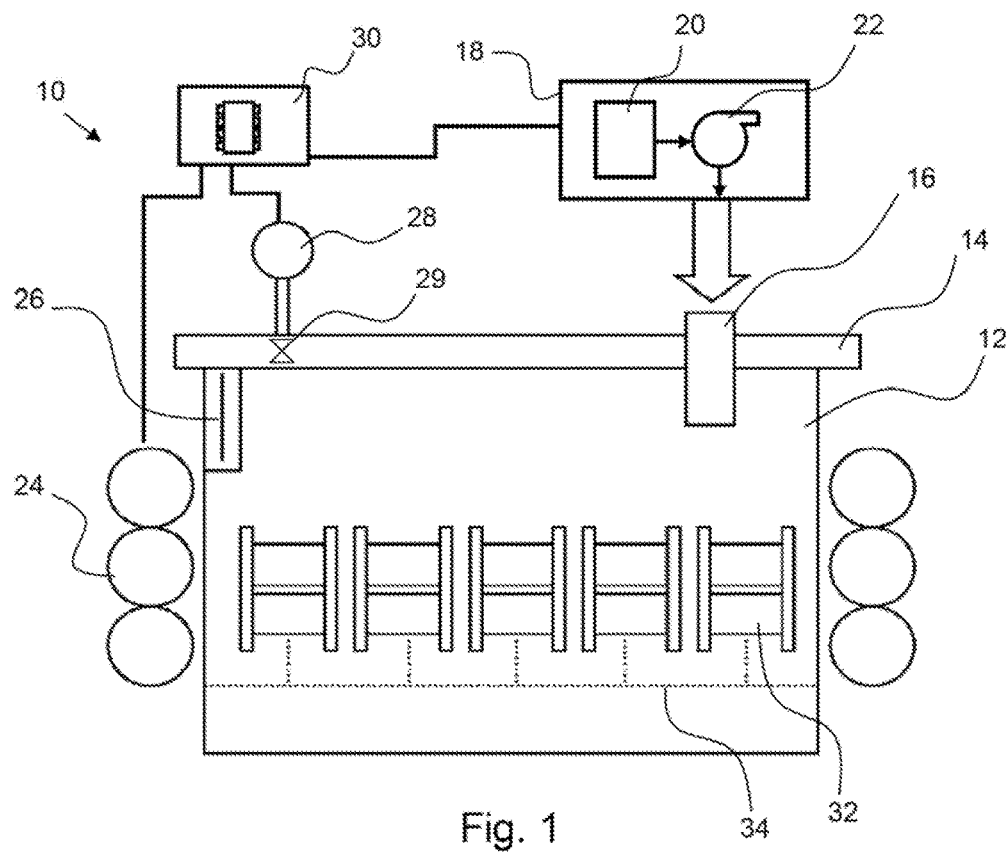
FIG. 1 shows a schematic view through coating removal apparatus used to implement a method of coating removal according to the present invention.

Turning firstly to FIG. 1, there is shown a schematic representation of a system 10 for removal of TBCs from components according to an example of the invention.

The system comprises a vessel 12 arranged to be substantially filled with a liquid medium in use. The vessel in this example comprises an autoclave although another bespoke pressure vessel may be used.

The vessel 12 has a selectively operable closure 14 which may comprise a lid/door or the like. The closure 14 forms a gas tight seal with the vessel 12 when closed that is able to withstand pressures in excess of 10 bar, and preferably a pressure equal to or greater than 50 or 100 bar.

The vessel 12 comprises a fluid delivery port 16, typically provided in a side wall or base of the vessel. A fluid delivery system 18 is arranged to provide fluid under pressure to the vessel interior via the port. The port 16 or else a conduit joining the fluid delivery system 18 to the vessel comprises a valve to allow selective delivery or shut-off of the fluid flow to the vessel. The fluid delivery system 18 in this example is shown as comprising a fluid source 20 (e.g. in the form of a storage tank) and a pump 22 for delivery of fluid under pressure to the vessel.

The vessel 12 has a heater 24, typically in the form of an electric heater. The heater element(s) are external of the vessel interior and may supply heat thereto via a vessel wall (or one or more conductor therein). In other embodiments the heater elements could extend into the interior of the vessel.

A temperature sensor in the form of a thermocouple 26 is provided on the vessel interior to monitor the temperature of the liquid in the vessel in use. The temperature sensor is located in a recess or well within an internal housing (e.g. a thermowell) in the vessel.

The vessel comprises a pressure gauge 28 for monitoring the internal pressure in the vessel (i.e. the static fluid pressure) in use. In this embodiment, the pressure gauge is provided in conjunction with a valve 29, which serves as a fluid outlet and/or pressure relief valve. However the valve 29 may be provided separately as necessary.

A system controller 30 comprises one or more processors and is arranged for communication of signals with the heater 24, thermocouple 26, pressure gauge 28 and fluid delivery system 18. The controller may comprise a user interface in order to allow a user to set one or more operational parameters of the system. The controller implements one or more control routines in order to carry out the method of the invention as will be described below, either automatically or semi-automatically based on the user input. In particular, the controller receives sensor readings from the pressure gauge 28 and temperature sensor 26 in use and controls operation of the heater 24, valve 29 and/or fluid delivery system 18 (e.g. the pump 22 and/or one or more valves therein) to ensure that predetermined operational parameters are maintained. Control signals are sent by the controller in particular in order to ensure desired pressure and temperature settings are achieved within the vessel.

The vessel 12 is arranged to receive multiple components 32 in use, which, in this example, comprise Nozzle Guide Vanes (NGV) of the high pressure turbine of a gas turbine engine. The vessel could also hold other gas turbine engine components, such as turbine blades.

A support structure 34 may be provided to hold the components at a desirous spacing and/or orientation within the vessel. The support structure may provide a mount for the plurality of components. The support structure may be removably locatable in the interior of the vessel in use and may provide a suitable structure for inserting/removing the components from the vessel. Such tooling may be component-specific (i.e. to support a plurality of components of a common type) or else individual supports may be provided for each component, thereby allowing a number of different components to be separately mounted in the vessel.

In use, the components are inserted into the vessel, which is then closed. The vessel is filled with a suitably inert liquid medium with respect to the component and TBC materials, which in this example comprises water. The water is preferably deionised and/or demineralised. Distilled water may be used for this purpose although other forms of conventional water treatment may be used to this end as would be understood by the person skilled in the art.

The vessel is preferably completely or partially filled at least to the extent that the level of liquid is sufficient to completely cover the components 32 within the vessel. Typically partial filling of the vessel is used to allow expansion of the liquid upon heating. Any remaining air or gas can be removed as necessary.

The vessel may be filled via fluid delivery port 16, although it is to be noted that the liquid medium is intended to be provided by means other than the fluid delivery system 18. Accordingly, the water may be poured into the vessel prior to sealing the closure 14 or else provided via a further port in the vessel.

Once the vessel is filled to the required level, the water is first de-oxygenated by supplying a suitable gas to the vessel via fluid supply system 18. The gas is supplied under pressure from a storage tank or chamber 20 to the port 16 into the vessel interior. The port may be provided on the base of the vessel to allow the gas to bubble through the water in the vessel. A plurality of ports 16 may be provided or other means, such as baffles, a perforated plate structure or the like, for allowing bubbles of gas to be more evenly dispersed over the area of the vessel 12.

Gas is allowed to escape via the valve 29 such that an air or other unwanted gases are flushed out of the vessel during de-aeration.

Once the vessel has been prepared as described above, the valve 29 is closed and the heater activated to heat the contents of the vessel to a predetermined temperature. The predetermined temperature is preferably greater than 120° C. and so an over pressure is maintained within the vessel to prevent boiling of the water therein.

In order to achieve the desired pressure in the vessel, the controller 30 controls supply of additional gas (e.g. nitrogen) under pressure via the pump 22 of the fluid deliver system 18. Once a desired pressure has been achieved, the inlet valve at port 16 can be closed such that the vessel is entirely sealed.

In an alternative embodiment to that described above, the fluid delivery system may allow for the delivery of the liquid medium to the vessel. Accordingly the storage tank 20 may comprise the port arrangements to allow de-aeration of the water prior to delivery to the vessel 12. The pump 22 may deliver the water under pressure to the vessel. Thus the operating pressure within the vessel interior could also be supplied by the liquid pressure applied by pump 22.

In one example of the invention, the vessel may be pressurised first, prior to increasing the internal temperature. However, more typically, the temperature and pressure may be modified concurrently based on sensor readings fed to the controller 30 from sensors 26 and 28 in order to ensure that the desired overpressure is achieved to prevent boiling. A simple open-loop or closed loop control system may be implemented to maintain the desired operating temperature and pressure inside the vessel.

It is envisaged that the temperature will be increased to a desired level and maintained substantially fixed at that value for a predetermined duration. It has been found that under such elevated temperature conditions, the zirconia in the TBC will undergo an environmental phase change in ceramic crystal structure. Zirconium dioxide may adopt one of three different crystal structures, namely monoclinic (at lower temperatures), tetragonal (above 1170° C.), or cubic (above 2370° C.). A phase change to a lower-temperature crystal structure (e.g. from tetragonal to monoclinic, or cubic to tetragonal) causes volume expansion, thereby inducing internal stress within the TBC, causing it to break up over time. It has been found that the TBC can completely disintegrate in this manner over a time period that is dependent on the temperature of the surrounding medium.

Initial trials were conducted on bulk ceramic material in water at 100° C. and it was found that complete disintegration of the bulk material could take a number of months, or even up to one year. It is believed that such a TBC removal process has not been hitherto discovered due to the relatively long time periods required for a change in the ceramic to be evident, coupled with the operating conditions that are outside any normal operating conditions for a TBC of this kind. However it has been found that the timescale for disintegration of a relatively thin layer of TBC will be lower than that for the bulk material and also that the processing temperature (and/or pressure) can be increased to decrease processing time significantly. It has been found that a processing temperature in the vessel 12 of 120° (e.g. at 2 bar pressure) or greater is beneficial to the TBC removal process. Whilst the invention may be useful even over long time periods (e.g. of one or more months) if batch sizes can be increased to make such a time scale viable, it is envisaged that the invention will be particularly useful if processing timescales can be reduced to a number of days (e.g. less than one month or a couple of weeks). It is to be further noted that such a failure mode of TBC's does not occur in an air environment at the temperatures discussed above.

The difference in material properties between an underlying metal component and the thermal barrier coating (in particular the ductility of a metal compared to that of a ceramic) results in the TBC reliably breaking up without deformation of the metal component.

Figure 2:
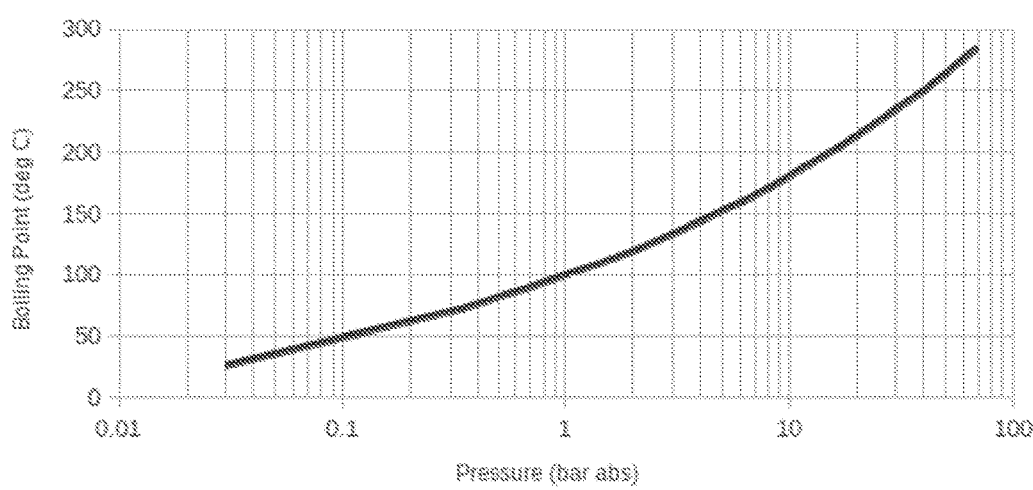
FIG. 2 shows a chart of boiling point against pressure, indicating a desirable operational range for use according to embodiments of a method of coating removal according to the present invention.

Turning to FIG. 2, there is shown a graph of the boiling point of pure water against pressure. It has been determined that the process according to the invention would be particularly effective for temperatures above 200° C. (i.e. with an absolute pressure in a vessel containing pure water of greater than 15 bar). Under practical considerations, there may be an upper limit to the temperature that can be achieved inside the vessel based upon the maximum limit of the vessel and heater and/or the maximum pressure achievable. The cost of equipment offering elevated temperature and pressure thresholds may be prohibitive to the use of water for temperatures above 350 or 400° C. In further embodiments it may be beneficial to use a different, relatively inert liquid other than water, which offers a higher boiling point, such as a lubricating oil or similar.

In some embodiments it may be beneficial to vary the temperature within a range above the minimum threshold to increase the rate of breakup of the TBC. The temperature may be varied by the controller between minimum and maximum thresholds, e.g. cyclically or at irregular or random time intervals, with a view to shortening the coating removal process time.

Once the TBC has been completely removed from the components 32, the vessel is allowed to cool and depressurised via relief valve 29. The components are removed and dried, thereby resulting in the underlying metal structure of the components 32 being exposed. It has been found that removal of the TBC in this manner does not have any detrimental effect on the surface properties of the metal structure such that the component can be re-coated or otherwise salvaged without further processing.

The underlying metal material of the component may comprise titanium, aluminium or any other conventional metal or alloy (e.g. a superalloy), for example comprising steel, nickel, chromium, etc as may be used in relevant engineering applications. In applying a TBC, it will be appreciated that any such conventional materials may require a bond coat such as, in the case of a nickel superalloy, an MCrAly or Pt-based coating to ensure good adherence between the TBC and the underlying material. Any such conventional bond coat may be present in the component to be treated.

It is proposed that the invention also allows for a partial TBC to be removed from a component, for example if a partial TBC has been applied over only a limited portion of the component (e.g. using a line-of-sight coating process). Thus the invention can be used to treat an entire component without complication due to the presence of partial or incomplete coatings. Furthermore the invention is particularly useful if an error or fault has occurred during a TBC coating process, such that an incomplete or defective coating has been applied. Thus the invention can be used to return the component to its uncoated state in readiness for recoating the component.

Whilst the invention has been described above with specific reference to turbine vanes for a gas turbine engine, it will be appreciate that the techniques described above may be applied to other gas turbine engine components to which thermal barrier coating are applied, such as turbine blades and/or casing components. The invention is particularly suited to any metal components with thermal barrier coatings that are intended to be impacted/heated by combustion products in a combustion engine. However the invention is not so limited and may be applied to any components (particularly high value components) for which there exists a need to uniformly remove a thermal barrier coating from a metal structure.

The invention claimed is:

1. A method of removing a thermal barrier coating from a metal component, the method consisting of:
   immersing at least one metal component having a thermal barrier coating in a liquid purified water reservoir, the liquid purified water reservoir containing a liquid consisting of liquid purified water, and
   maintaining the liquid purified water in the liquid purified water reservoir at a temperature above 100° C. and at above atmospheric pressure for a time sufficient to disintegrate, and thereby completely remove the thermal barrier coating from the at least one metal component.

2. The method according to claim 1, wherein the liquid purified water in the liquid purified water reservoir is maintained at a temperature of greater than 150° C.

3. The method according to claim 1, wherein the liquid purified water in the liquid purified water reservoir is maintained at a temperature greater than the temperature at which the liquid purified water would boil under atmospheric pressure.

4. The method according to claim 1, wherein the thermal barrier coating comprises zirconia.

5. The method according to claim 1, wherein the liquid purified water in the liquid purified water reservoir is maintained at the temperature above 100° C. for a period of a plurality of hours.

6. The method according to claim 1, wherein the liquid purified water in the liquid purified water reservoir is maintained at the temperature above 100° C. for a period of days.

7. The method according to claim 1, wherein the thermal barrier coating comprises a crystal structure and the thermal barrier coating breaks up within the liquid purified water under internal stress caused by a change in crystal structure therein.

8. The method according to claim 1, comprising de-aeration of the liquid purified water prior to heating.

9. The method according to claim 1, wherein a plurality of the metal components are submerged in the reservoir and heated.

10. The method according to claim 1, wherein the liquid purified water is deoxygenated.

11. The method according to claim 1, wherein the liquid purified water is deionized.

12. The method according to claim 1, wherein the liquid purified water is demineralized.

13. The method according to claim 1, wherein the liquid purified water is distilled.

14. A method of removing a thermal barrier coating from a metal component, the method consisting of:
    immersing at least one metal component having a thermal barrier coating bonded thereto in a liquid reservoir, the liquid reservoir containing a pH neutral liquid, and
    maintaining the pH neutral liquid in the liquid reservoir at a temperature above 100° C. and at above atmospheric pressure for a time sufficient to disintegrate, and thereby completely remove the thermal barrier coating from the at least one metal component.

15. The method according to claim 14, wherein the liquid in the liquid reservoir is maintained at a temperature of greater than 150° C.

16. The method according to claim 14, wherein the liquid in the liquid reservoir is maintained at a temperature greater than the temperature at which the liquid would boil under atmospheric pressure.

17. The method according to claim 14, wherein the liquid reservoir contains a liquid consisting of liquid purified water.

18. The method of claim 14, wherein the liquid consists of a lubricating oil.

* * * * *